(12) United States Patent
DeForest et al.

(10) Patent No.: US 6,275,860 B1
(45) Date of Patent: Aug. 14, 2001

(54) METHOD AND APPARATUS FOR SYNCHRONIZING FUNCTION VALUES IN A MULTIPLE PROTOCOL SYSTEM

(75) Inventors: Miles A. DeForest, Bahama; Mark A. O'Connell, Chapel Hill, both of NC (US)

(73) Assignee: EMC Corporation, Hopkinton, MA (US)

(*) Notice: Subject to any disclaimer, the term of this patent is extended or adjusted under 35 U.S.C. 154(b) by 0 days.

(21) Appl. No.: 09/392,192

(22) Filed: Sep. 9, 1999

(51) Int. Cl.[7] .................................................... G06F 15/16
(52) U.S. Cl. ......................... 709/230; 709/230; 709/206; 709/224; 370/465; 379/88.13; 707/8; 707/101; 707/103; 380/25
(58) Field of Search ..................................... 709/230, 206, 709/224, 246; 707/8, 101, 103; 713/200; 379/88.13; 380/25; 395/200.49; 370/465

(56) References Cited

U.S. PATENT DOCUMENTS

| | | | | |
|---|---|---|---|---|
| 4,961,224 | * | 10/1990 | Yung | 380/25 |
| 5,692,178 | * | 11/1997 | Shaughnessy | 707/8 |
| 5,715,397 | * | 2/1998 | Ogawa et al. | 709/246 |
| 5,930,801 | * | 7/1999 | Falkenhainer et al. | 707/103 |
| 6,006,018 | * | 12/1999 | Burnett et al. | 395/200.49 |
| 6,031,895 | * | 2/2000 | Cohn et al. | 379/88.13 |
| 6,081,807 | * | 6/2000 | Story et al. | 707/101 |
| 6,134,582 | * | 10/2000 | Kennedy | 709/206 |
| 6,182,222 | * | 1/2001 | Oparaji | 713/200 |
| 6,185,615 | * | 2/2001 | Labiaga et al. | 709/224 |

\* cited by examiner

*Primary Examiner*—Ayaz Sheikh
*Assistant Examiner*—Thu Ha Nguyen
(74) *Attorney, Agent, or Firm*—Gary D. Clapp, Esq.

(57) ABSTRACT

A method and mechanism for function value synchronization among protocols in a shared resource unit providing shared resources to a plurality of resource users submitting requests for shared resource operations in a plurality of protocols wherein each request includes at least one primary function value and at least one associated function value. A database is constructed having a values entry for each primary value wherein each values entry contains a primary field for storing the corresponding primary value and an associated field for storing an associated value for each protocol. Unknown associated values are represented by sentinel values, and the sentinel values representing associated values are replaced by the appropriate associated values obtained from a system administrative function that maps the primary and associated values of the protocols. The replacement of sentinel values may occur upon a request for a shared resource that contains an associated value represented by a sentinel value and, for the whole database, upon a partial or complete base depending upon whether a partial remapping, such as an update, is to be performed or an complete remapping is to be performed.

22 Claims, 6 Drawing Sheets

SYSTEM 2

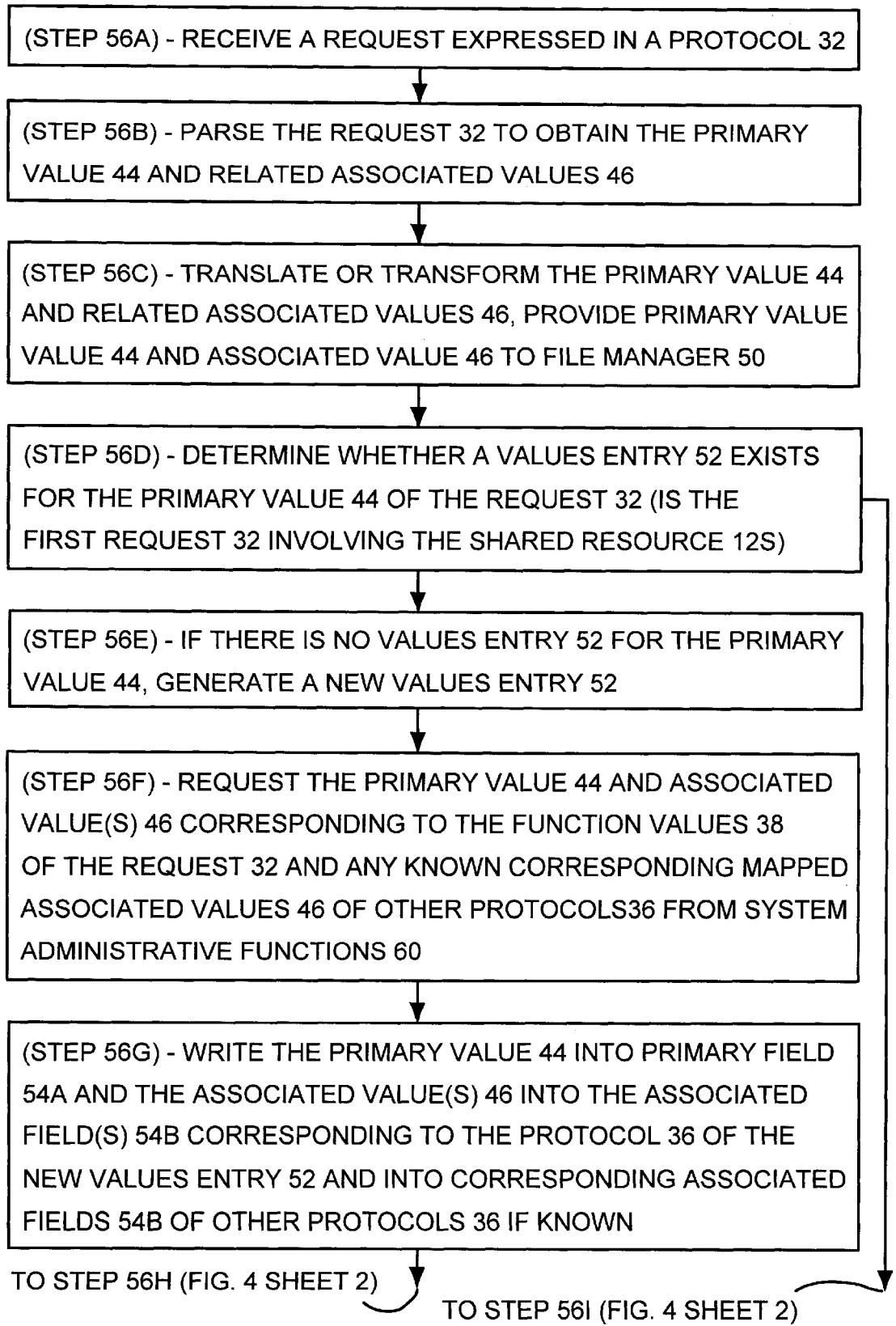
FIG. 4 (SHEET 1 OF 2)

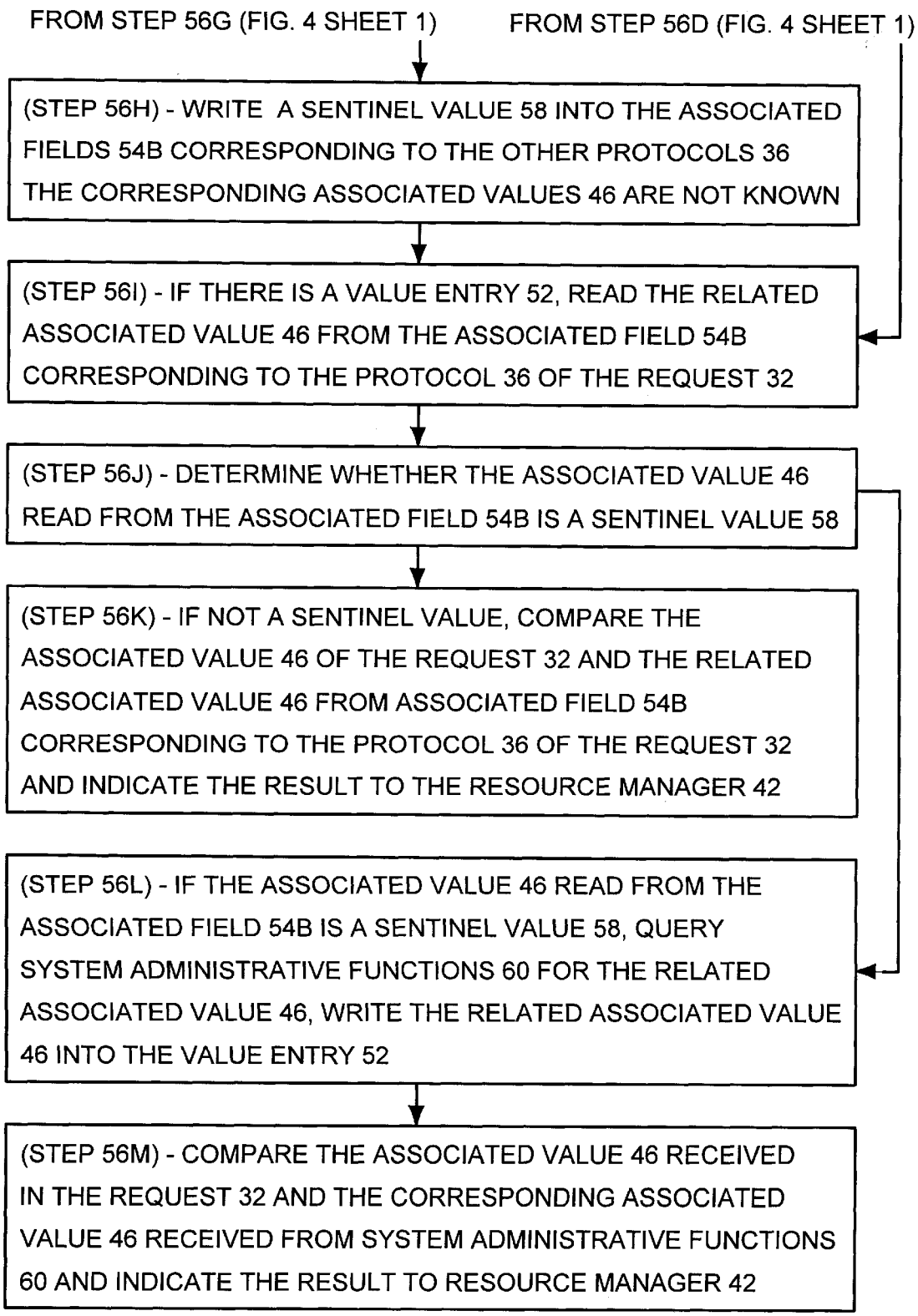
FIG. 4 (SHEET 2 OF 2)

METHOD AND APPARATUS FOR SYNCHRONIZING FUNCTION VALUES IN A MULTIPLE PROTOCOL SYSTEM

FIELD OF THE INVENTION

The present invention relates to a method and apparatus for synchronizing function values in a multiple operating environment system and, in particular, for allowing a system operational unit that is providing shared system resources and is required to respond to or to execute protocols of a plurality of operating environments to maintain, recognize and respond to a different set of function values for each operating environment for each shared resource managed by the shared resource unit wherein the function values, for example, identify a shared resource or a user or to control an operation to be performed.

BACKGROUND

Many contemporary computer systems, such as multiple processor systems and networked systems, include shared resource units, such as file servers and processors, to allow system resources, such as data, programs and storage space and various functions or operations, to be shared among a plurality of users. Typical examples of shared resource units are file servers wherein a number of local or networked users or systems may share the file server to have common access to and share resources such as storage space, data and programs, or the shared processors of multiple processor systems wherein tasks are assigned to processors depending on availability, priority or processor functionality.

A recurring problem with such shared resources, however, is that the systems sharing a resource frequently execute different operating environments, such as UNIX and Microsoft Windows™, and thereby communicate with the shared resource unit with different resource protocols, or may execute a number of different rescue protocols performing a similar or common function or operation within the same operating environment. In addition, the shared resource unit itself may be required to execute multiple operating environments in order to interoperate with the systems sharing that resource. As a result, not only must a shared resource unit respond to or execute multiple resource protocols, but the function values used to access a shared resource, that is, the names or identifiers used to identify and refer to a particular file, program, function, operation or user or to control the execution of a program, function or operation, will typically vary from operating environment to operating environment or from resource protocol to resource protocol, even though they are similar in function.

In the instance of a file server system, for example, a request for access to a given file will typically include the file name and an identifier of the requesting user or system. The file server will use the file name to locate and access file and the requester identification to determine the requester's access rights to the file by comparing the requester identification with a file "owner" identification associated with the file, wherein an "owner" of a file is a user having access rights to the file. If, for example, the file request is submitted by a system executing UNIX and the Network File System (NFS) protocol, the requester identification will be in the form of a User Identifier (UID), which would require that the file server maintain "owner" identifications in the form of UIDs. If the file request is submitted by a system executing Microsoft Windows and the Common Internet File System (CIFS) protocol, the requester identification will be in the form of a Security Identifier (SID) and the file server would be required to maintain "owner" identifications in the form of SIDs. In this example, therefore, the system operational unit, that is, the file server, must respond to or execute two operating environments, UNIX and Windows, and respond to two protocols, NFS and CIFS, and must maintain and recognize two different but equivalent function values, UIDs and SIDs, that may be associated with each shared file.

It will be apparent that the requirement of maintaining, recognizing and responding to a different set of function values for each operating environment or resource protocol for each shared resource managed by a shared resource unit will result in such problems as increased cost and complexity and increased processing time with a resulting decrease in operating speed. In addition, it will be recognized that at the time of creation of or initial access to a system resource such as a program or data file, only the function values of the operating environment or resource protocol creating or initially accessing the system resource will be known and may be associated with the resource. As such, each subsequent access of the system resource initiated from a different operating environment or resource protocol will require additional processing time and resources to correlate the function values of each new environment with the resource. Also, errors may occur when, for example, a file server does not recognize the "name" of a valid owner of a file when that name is submitted in a request from a different operating environment or resource protocol, or confuses an invalid "owner name" from one environment with a valid "owner name" from a different environment or protocol. Errors may also arise when the shared resource attempts to correlate function values from new environments or protocols with function values of previously known environments or protocols.

The present invention provides a solution to these and other problems of the prior art.

SUMMARY OF THE INVENTION

The present invention is directed to a method and mechanism for function value synchronization in a shared resource unit providing shared resources to a plurality of resource users submitting requests for shared resource operations in a plurality of protocols.

According to the present invention, the mechanism receives a request for a shared resource operation expressed in a protocol wherein the request contains a function value representing a primary value relating to a shared resource and a function value representing a related associated value that is related to the primary value and is used in performing the requested operation. A protocol interface and a resource manager parse the request to obtain the primary value and the related associated value, and a database generator determines whether a database contains a values entry corresponding to the primary value appearing in the request.

If the database does not contain a corresponding values entry, the database manager constructs a values entry in the database wherein each values entry includes a primary value field for storing a primary value and an associated value field for each protocol of the plurality of protocols, each associated value field for storing a related associated value of the corresponding protocol. The database manager constructs the values entry by obtaining the related associated value corresponding to the primary value received in the request and the protocol of the request, writing the primary value into the primary value field of the corresponding values entry, writing the related associated value into the associated value field corresponding to the request protocol, and writing a sentinel value into each remaining associated value field of the values entry.

The database manager then reads the associated value field corresponding to the protocol of the request from the values entry corresponding to the primary value, and if the value in the associated value field corresponding to the request protocol is a related associated value other than a sentinel value, compares the related associated value read from the associated value field corresponding to the request protocol to the related associated value received in the request and indicates a result of the comparison to a resource manager.

If the value in the associated value field corresponding to the request protocol is a sentinel value, the database manager queries a system administrative function with the primary value read from the corresponding values entry, receives from the system administrative function a related associated value corresponding to the primary value and to the protocol of the request, and writes the related associated value into the associated field of the values entry corresponding to the protocol of the request in replacement of the sentinel value. The database manager then compares the related associated value received in the request with the related associated value written into the associated value field corresponding to the protocol of the request and indicates the result of the comparison to the resource manager.

In a present implementation of the invention, the resource manager is a file server, the shared resources are files stored in the file server, the primary values are file identifiers, and the related associated values are file owner identifications.

The function value synchronization mechanism of the present invention may also perform partial or complete remappings of the functions values. According to the present invention, when the database manager determines that the remapping of function values is to be a partial remapping, the database manager initially identifies the associated fields containing the sentinel value and the corresponding primary values and, when the database manager determines that the remapping of function values is to be a complete remapping, the database manager writes the sentinel value into the associated fields of all the values entries. The database manager then identifies all associated fields containing the sentinel value, queries the system administrative functions with the primary values corresponding to all associated fields containing the sentinel value, receives from the system administrative functions the associated values corresponding to associated field containing the sentinel value and that are available, and writes the associated values received from the system administrative functions into the corresponding associated fields in replacement of the sentinel value.

BRIEF DESCRIPTION OF THE DRAWINGS

The foregoing and other objects, features and advantages of the present invention will be apparent from the following description of the invention and embodiments thereof, as illustrated in the accompanying figures, wherein.

DESCRIPTION OF THE INVENTION

As will be described below, the present invention provides a method and apparatus for shared resource units, such as file servers and processors, to provide resources, such as data, programs and storage space and various functions or operations, to be shared among a plurality of users wherein the shared resource unit or the users are executing or are required to execute a plurality of different operating environments or resource protocols. In particular, the present invention provides a method and apparatus for a shared resource unit to maintain, recognize and respond to a different set of function values for each operating environment or resource protocol for each shared resource managed by the shared resource unit wherein the function values, for example, identify a shared resource or a user or to control an operation to be performed. As described, typical examples of shared resource units are file servers wherein a number of local or networked users or systems may share the file server to have common access to and share resources such as storage space, data and programs, or the shared processors of multiple processor systems wherein tasks are assigned to processors depending on availability, priority or processor functionality.

The present invention will be described in the following with particular respect to the specific example of a file server in a networked system. It will be recognized, however, that the exemplary shared file server is representative and illustrative of a general shared resource architecture that may be readily adapted to perform any system function or operation, depending upon the programs implemented therein. It will be thus be recognized that the method and apparatus of the present invention may be applied in any shared resource that is required to execute or to respond to protocols of a plurality of operating environments wherein each protocol or operating environment may use a different set of function values for similar or identical purposes.

Figure 1:
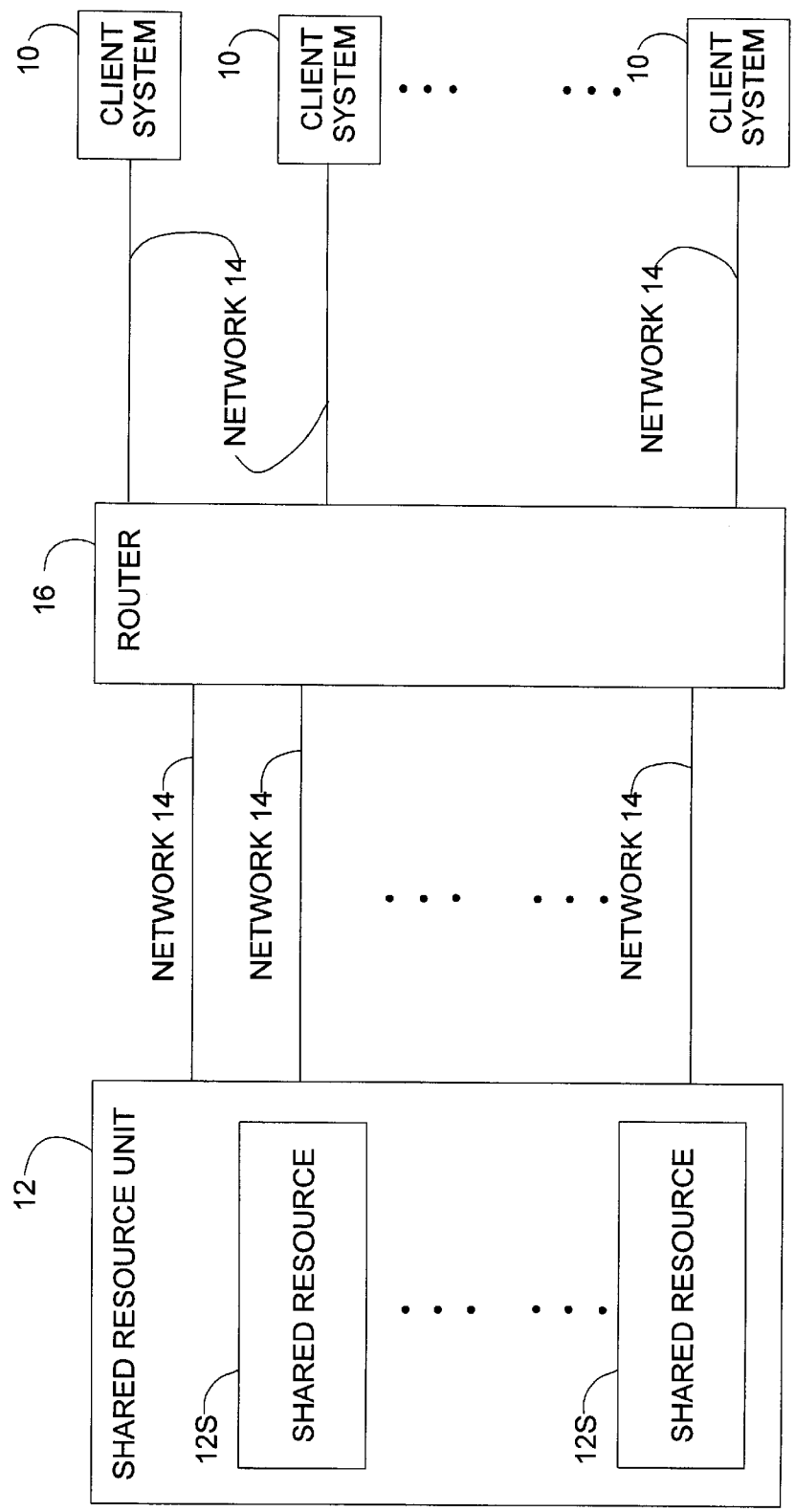
FIG. 1 is a block diagram of a networked system including a shared resource unit providing a shared resource to the networked system.

Referring, therefore, to FIG. 1, therein is shown a diagrammatic representation of a System 2 wherein one or more Client Systems 10 are connected with a Shared Resource Unit 12 through one or more Networks 14. Client Systems 10 may be, for example, general purpose or dedicate processors of various types, such as personal computers, shared central processors or a networked processor system or a multi-processor system and may execute different operating environments or different protocols to communicate with Shared Resource Unit 12. Shared Resource Unit 12 is, for example, a file server or one or more general purpose or specialized processors, and allows Shared System Resources (Shared Resources) 12S, such as data, programs and storage space and various functions or operations to be shared among Client Systems 10. In the present example that will be discussed below, for example, Shared Resource Unit 12 is a multiple processor file server providing shared storage space and shared data or program files to Client Systems 10. Networks 14, in turn, may be local area networks or wide area networks of various types, including, for example, system buses, proprietary networks, Ethernet networks or the Internet, and the connections through Networks 14 may be direct, or through various forms of Routers 16.

Figure 2:
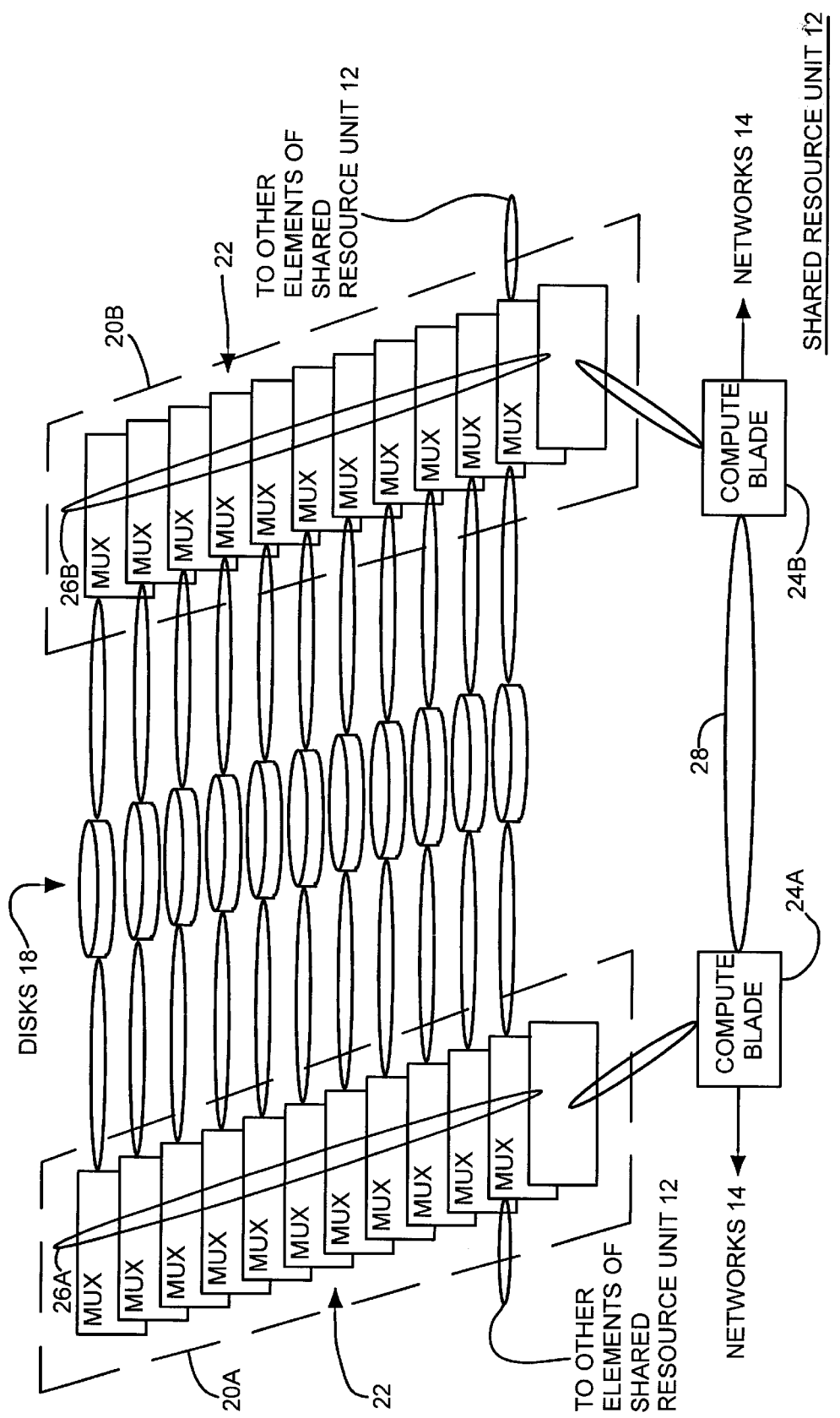
FIG. 2 is a block diagram of a shared resource unit.

Referring to FIG. 2, therein is shown a diagrammatic representation of Shared Resource Unit 12 wherein, for purposes of the present exemplary discussion and as described, Shared Resource Unit 12 is a multiple processor/multiple disk file server, such as a Data General Corporation Clarion™ File Server. As illustrated therein, Shared Resource Unit 12 includes a plurality of hard Disk Drives 18 and dual Multiplexer Banks (MUX Banks) 20A and 20B, each of which is comprised of a plurality of Multiplexers (MUXs) 22, together forming a storage sub-system, and dual Processor Blades (Blades) 24A, which together comprise a computational and control sub-system that controls the operations of the storage sub-system and provides, for example, input/output functions to and from Networks 14. Although not shown in detail in FIG. 2, each of Processor Blades 24 is a fully functional computational processing unit including a processor, such as a Pentium™ III microprocessor, a memory, a local disk drive, and input/output components, such as network drivers, a monitor and keyboard, and so on. Each of Blade Processors 24 is thereby capable of performing a full range of functions and operations, depending upon the programs installed and executing therein. In the present exemplary implementation of the invention, for example, one of Blade Processors 24 may execute file system protocol programs and perform the functions and operations associated with the specific file system protocols, such as the Network File System (NFS) protocol and the Common Internet File System (CIFS) protocol. The other of Blade Processors 24, in turn, may perform the functions and operations directly associated with controlling Disk Drives 18, such as RAID type file management functions and disk input/output operations.

As shown, each of Disk Drives 18 is bidirectionally connected to a MUX 22 of MUX Bank 20A and to a MUX 22 of MUX Bank 20B and the MUXs 22 of MUX Bank 20A are interconnected through a Loop Bus 26A while the MUXs 22 of MUX Bank 20B are interconnected through a Loop Bus 26B, so that each Disk Drive 18 is accessible through both Loop Bus 26A and Loop Bus 26B. In a like manner, Processor Blade 24A is bidirectionally connected to Loop Bus 26A while Processor Blade 24B is bidirectionally connected to Loop Bus 26B and Processor Blades 24A and 24B are directly interconnected and communicate through a Blade Bus 28. Processor Blades 24A and 24B are thereby able to communicate with any of Disk Drives 18, either directly through their associated Loop Bus 24 or indirectly through the other of Processor Blades 24, and may communicate directly with each other.

It will also be noted that, as indicated in FIG. 2 and as discussed above, Processor Blades 24 include network drivers to provide communications interfaces between Shared Resource Unit 12 and Networks 14. In addition, it is shown that a MUX 22 of each of MUX Banks 20 is connected other elements of the Shared Resource Unit 12, such as power and diagnostic/fault monitoring circuits and components, so that Processor Blades 24 may control these functions through Loop Buses 26 and the appropriate MUXs 22.

Finally with respect to the general description and discussion of a Shared Resource Unit 12, it will be recognized that each of Blade Processors 24 is capable of performing a full range of functions and operations, depending upon the programs installed and executing therein, and that each of Blade Processors 24 is capable of functioning as a general purpose or specialized processor, as well as a file server controller. In addition, Blade Processors 24A and 24B may provide duplicate, redundant functions or may perform separate and independent or separate and related functions and operations and may execute different operating environments, depending on the programs resident in each of Blade Processors 24. Still further, a given Shared Resource Unit 12 may include a plurality of Blade Processor 24 pairs, a single processor or a plurality of independent processors, and may include one or more specialized processors or functional units connected in the same manner as a Blade Processor 24 or a greater or lesser number of Disk Drives 18, and so on. It will therefore be understood by those of ordinary skill in the relevant arts that Shared Resource Unit 12 is representative and illustrative of a general shared resource architecture that may be readily adapted to perform any system function or operation, depending upon the programs implemented therein.

Having described a general context and specific implementation of a shared resource system that may incorporate the present invention, the following will focus on the present invention, which is a method and apparatus for a shared resource unit to maintain, recognize and respond to different sets of function values for different operating environments or resource protocols for each shared resource managed by the shared resource unit wherein the function values, for example, identify a shared resource or a user or to control an operation to be performed.

Figure 3:
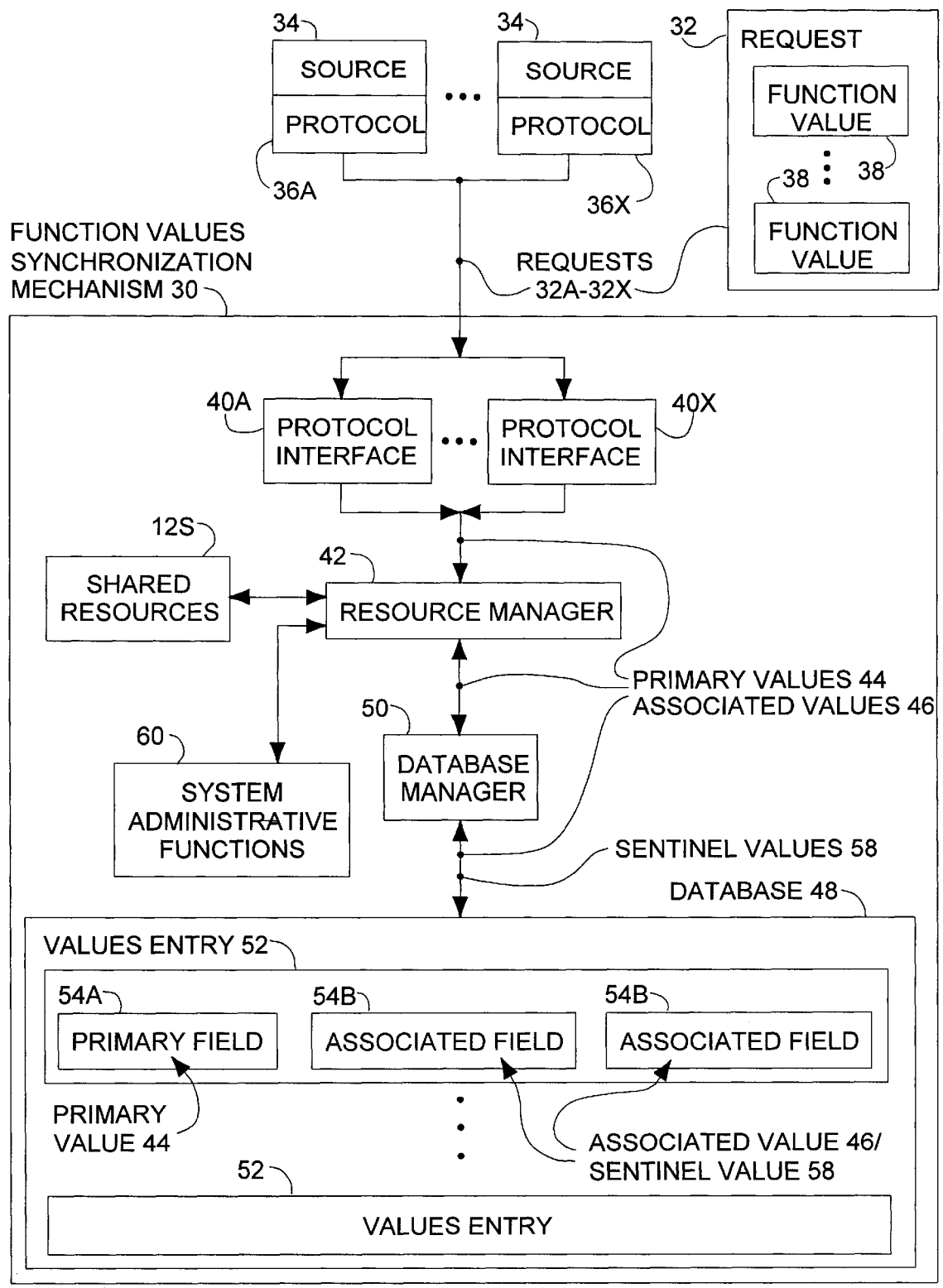
FIG. 3 is a diagrammatic representation of a resource control unit implementing the present invention; and, FIGS. 4 and 5 are flow diagrams illustrating the operation of the present invention.

Referring to FIG. 3, therein is shown a diagrammatic representation of a Function Value Synchronization Mechanism 30 implemented, for example, in one or both of Blade Processors 24 of a pair of Blade Processors 24A and 24B for performing the functions and operations to maintain and provide a shared resource according to the present invention, such as shared data or program files or storage space in a file server. It will be noted that the details of the design, construction and operation of many of the components, functions and operations of a Function Value Synchronization Mechanism 30 for a wide range of different types of shared resources will be readily understood by those of ordinary skill in the relevant arts without the need for detailed descriptions, as will many of the aspects of various implementations of the present invention. As such, the following will focus those aspects of the present invention necessary to allow one of ordinary skill in the relevant arts to practice and implement embodiments of the present invention.

The following will first consider and discuss the forms and formats in which requests for shared resource operations may be presented to or received by a Shared Resource Unit 12 that provides a Shared Resource 12S in a System 2, thereby illustrating the problems in shared resource management that are addressed by the present invention.

As illustrated in FIG. 3, and has been discussed above with respect to FIGS. 1 and 2, a Shared Resource Unit 12 will receive Requests 32 from a plurality of Sources 34, each of which may be, for example, a Client System 10, and each Sources 34 may generate Requests 32 using one or more of a plurality of different Protocols 36A–36X. As described, the existence of a plurality of different Protocols 36 in a System 2 may arise, for example, from the use of different operating environments in Sources 34 or the use of different resource protocols to perform the same operations of functions within a single operating environment.

Each Protocol 36 may generate a different form or format of Request 32, indicated as Requests 32A–32X, and each Request 32A–32X will, in turn, will include one or more Function Values 38. Certain of Function Values 38 will have a common or similar purpose or function, such as identifying the "owner" of a file, an operation to be performed, or a value to be used in controlling an operation, while other will have purposes or functions that are dependent upon the resource protocol and may having meaning only within the context of the protocol, such as values controlling execution of the protocol. Also, some Function Values 38 may be of identical or common form or format across a number of Protocols 36, such as some forms of file names. Others of Function Values 38, however, are protocol dependent in that the forms, formats or range of possible values for each of the Function Values 38 will depend upon the Protocol 36 that generated the Protocol Request 32.

As illustrated, Function Value Synchronization Mechanism 30 will typically include one or more protocol interface programs, represented in FIG. 3 as Protocol Interfaces 40A–40X, wherein each Protocol Interface 40 corresponds to and processes Requests 32 for a corresponding Protocol 36. In processing each Request 32, a Protocol Interface 40 will extract or parse the Function Values 38 of the received Protocol Requests 32 according to the corresponding Protocol 36 and provide the Function Values 38 to a Resource Manager 42 in forms that are usable by the Resource Manager 42.

As described, Function Values 38 may represent, for example, a function or operation that is to be performed, such as a file read or write operation, an identifier of the file, or an identifier of the "owner" of the file, and are used by the Resource Manager 42 in executing the request. In this regard, certain Function Values 38 may be of a common format or form across a number of Protocols 36, and Resource Manager 42 may be designed to utilize these Function Values 38 directly. In other instances, a Protocol Interface 40 may translate or otherwise transform certain Function Values 38 into equivalent values having forms that are usable by the Resource Manager 42. In this respect, such Function Values 38 may, for example, be single valued within a given Protocol 36, such as an instruction or command indicating an operation to be performed, such as a file read or write. Others of Function Values 38, however, may not be readily translatable or transformable into forms directly usable by the Resource Manager 42, and may therefore be provided directly to the Resource Manager 42 and used by Rescue Manager 42 in their original form or format. Such Function Values 38 may include, for example, file owner identifications, and may be multi-valued within the protocol, that is, will have a significant range of possible values, as well as being represented in different forms, formats or values, depending on the resource protocol that generated the request.

It will be apparent from the above discussions that a primary problem in managing and providing a shared resource in a system in which resource requests may be generated from a number of different environments or resource protocols is in providing a means whereby a resource manager may recognize and respond to, that is, synchronize, the different sets of function values that may be used in different operating environments or resource protocols to refer to or otherwise control or use each shared resource managed by the shared resource unit.

According to the present invention, certain of Function Values 38 appearing in a Request 32 are defined and designated as Primary Values 44 while others are defined and designated as Associated Values 46 and a Request 32 will typically include at least one Primary Value 44 and one or more Associated Values 46. A Primary Value 44 is defined as a Function Value 38 that identifies a Shared Resource 12S, such as a data or program file, memory or storage space, or a function or operation provided by a Shared Resource Unit 12. An Associated Value 46, in turn, is defined as a Function Value 38 that is related to or associated with a Primary Value 44 and contains a value that is used in executing the operation requested with respect to the Shared Resource 12S identified by the Primary Value 44, that is, is used by or in directing or controlling the requested operation. For example, a Request 32 may be a request to a file server to read a given file and would contain as a Primary Value 44 the file name or file identifier, a first Associated Value 46 that identifies an owner of the file, a second Associated Value 46 that identifies the operation to be performed, that is, the read operation, and so on. In another example, a Primary Value 44 could be a command or instruction identifying an operation to be performed, such as a mathematical operation or a print operation, and the Associated Values 46 could be the arithmetic values to be operated upon or the file name of a document file to be printed. In this regard, it should be noted that Primary Values 44 will typically appear as Function Values 38 that are directly usable by a Resource Manager 42 or that are readily translated into a form usable by a Resource Manager 42 because of having a single value or limited range of values within a protocol. Associated Values 46, however, may often appear as Function Values 38 having multiple values within each protocol.

As described, the present invention is directed to a method and apparatus for a shared resource unit to maintain and recognize, that is, synchronize, and respond to different sets of function values for different operating environments or resource protocols for each shared resource managed by the shared resource unit. In terms of the discussions herein above, the present invention is thereby directed to a method and apparatus for synchronizing, that is, relating, a plurality of related Associated Values 46, each of which represents the same or a corresponding Function Value 38 of a corresponding plurality of Protocols 36, to a given corresponding Primary Value 44 that similarly represents the same Function Value 38 in the corresponding Protocols 36. By way of example, such as the file server of the present exemplary System 2, a Primary Value 44 may be the name or identifier of a file while the related Associated Values 46 to be synchronized with the Primary Value 44 and with each other are the identifiers of the owner or owners of the file as expressed in the various protocols or operating environments in which file operation requests may be generated.

According to the present invention and as shown in FIG. 3, the present invention is implemented in a Resource Manager 42 by a Synchronized Value Database 48 and an associated Database Manager 50 that generates a Values Entry 52 in Synchronized Values Database 48 for and corresponding to each Primary Value 44 that is known to Resource Manager 42, that is, that has appeared in a Request 32. As illustrated, each Value Entry 52 includes a Primary Field 54A for storing the Primary Value 44 to which the Value Entry 52 relates, and one or more Associated Fields 54B for storing related Associated Values 46 wherein there is an Associated Field 54B for and corresponding to each Protocol 36 supported or used by Sources 34, such as Client Systems 10 or the System 2.

Referring to FIG. 4, therein is illustrated the method of operation of a Function Value Synchronization Mechanism 30 of the present invention using the elements illustrated in FIG. 3 and wherein the method and apparatus of the present invention are related to the exemplary System 2 described herein above, that is, a file server system. In this example, Primary Values 44 represent file names in the operating environment executing in Blade Processors 24A and/or 24B. The exemplary system is assumed to support the Network File System (NFS) protocol wherein requester/owner identifications, that is, certain of the related Associated Values 46, will be in the form of a Unique Identifiers (UIDs), and the Common Internet File System (CIFS) protocol wherein requester/owner identifications, that is, others of the related Associated Values 46, will be in the form of a Security Identifiers (SIDs). It will be noted that in the following discussion, the elements identified and shown in FIG. 3 and referred to in the following discussion pertaining to FIG. 4 will be related to the specific example of a networked file server supporting the NFS and CIFS protocols by inserts of the form [CIFS], and so on.

Figure 5:
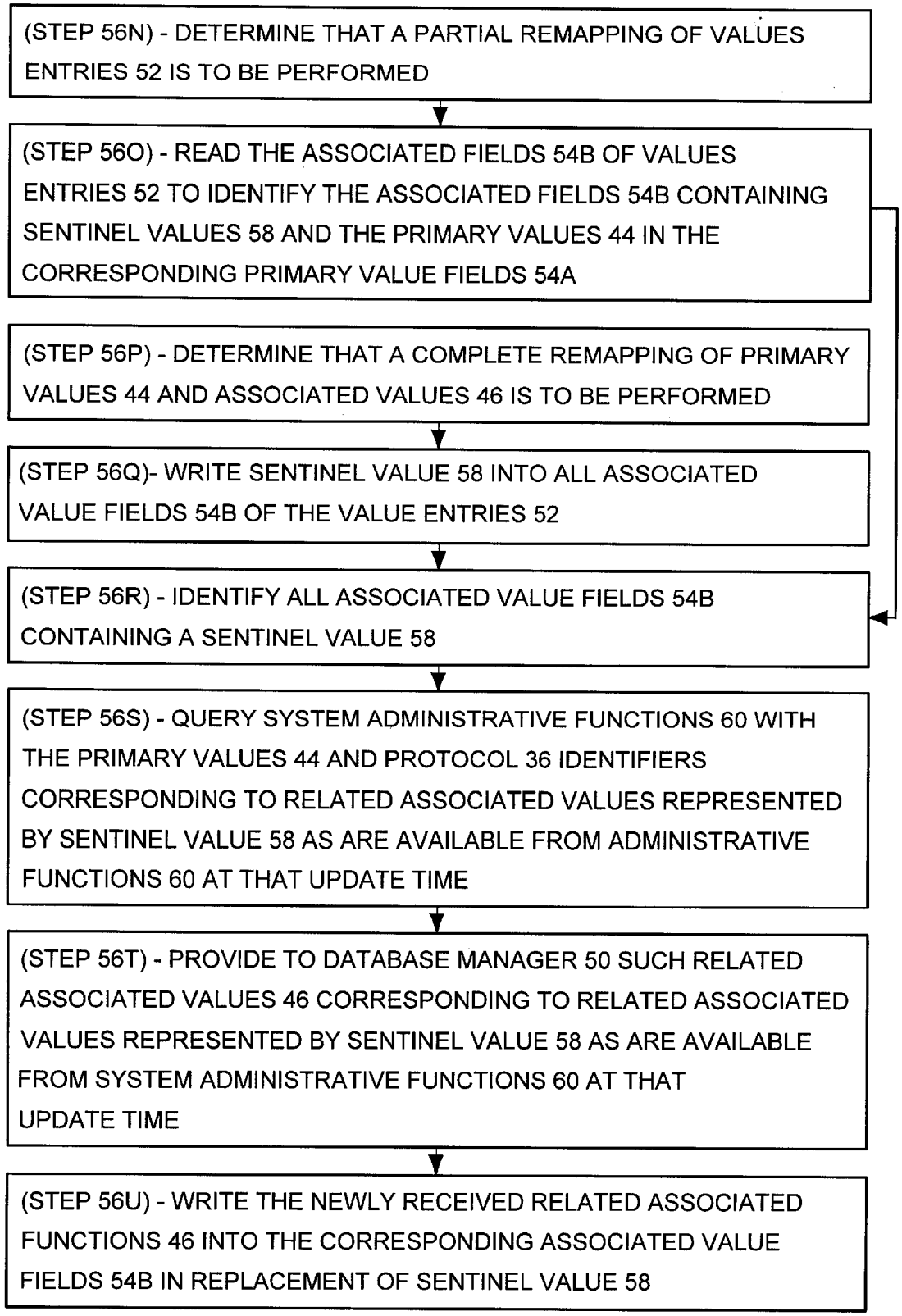

The operation of Function Value Synchronization is illustrated in FIGS. 4 and 5 for an example wherein each Request 32 includes a Primary Value 44 and a single related Associated Value 46 as the modifications and adaptations of the method for requests having multiple Primary Values 44 or multiple related Associated Values 46, or both, will be readily apparent to those of ordinary skill in the arts.

As illustrated in FIG. 4, Protocol Interfaces 40A–40X receive a Request 32 expressed in a first Protocol 36 [CIFS or NFS] (Step 56A) wherein the Request 32 contains a Function Value 38 representing a Primary Value 44 [file name] and a Function Value 38 representing a related Associated Value 46 [requester/owner name] associated with and related to the Primary Value 44. The appropriate Protocol Interface 40, operating itself or in conjunction with Resource Manager 42, depending upon the design choices of the implementer, will (Step 56B) parse the Request 32 to obtain the Function Value 38 representing the Primary Value 44 [file name] and the Function Value 38 representing the pertinent related Associated Values 46 [requester/owner name]. The Protocol Interface 40 or Resource Manager 42 or both operating together will (Step 56C) translate or transform the Primary Value 44 and related Associated Value 46 if necessary, possible and appropriate, depending on the Protocol 36, so that, for example, the Primary Value 44 is represented in a form and format native to or compatible with the operating environment of Resource Manager 42, and will provide these values to Database Manager 50.

Database Manager 50 will (Step 56D) determine whether a Values Entry 52 exists for this Primary Value 44, that is, whether this Request 32 is the first reference or request involving the Shared Resource 12S identified by the Primary Value 44.

At this point, it must be noted that Database Manager 50 may determine whether a given Request 32 is the first request pertaining to a given Shared Resource 12S in a number of ways. For example, Database Manager 50 may also determine whether a Request 32 is the first Request 32 received by Resource Manager 42 pertaining to a specific Shared Resource 12S from the form or type of operation requested. That is, a first request pertaining to a Shared Resource 12S will typically be a request to create or initialize a resource. In the instance of a shared file manager, for example, the first request received pertaining to a specific file will typically be a request to create a file or to write the file into the file server for the first time, and the request will include an identifier, such as file name, of the new Shared Resource 12S and an identification of the creator, that is, owner of the Shared Resource 12S.

If there is a Values Entry 52 corresponding to the Primary Value 44, the process proceeds to Step 56I. If there is not a Values Entry 52 corresponding to the Primary Value 44, the process proceeds to Step 56F.

Database Generator 50 will then (Step 56F) query System Administrative Functions 60 for all known related Associated Values 46 corresponding to this Primary Value 44, that is, for the related Associated Value 46 for the Protocol 36 of the Request 32 and the mappings of the corresponding related Associated Values 46 of other Protocols 36. Database Generator 50 will then (Step 56G) write the Primary Value 44 [file name] into Primary Field 54A of the new Values Entry 52, and the presently known Associated Values 46 [requester/owner name] into the Associated Fields 54B corresponding to the Protocols 36 [CIFS or NFS].

It will be noted with respect to Steps 56F and 56G that upon receiving a first request pertaining to a Shared Resource 12S, and possible for many requests thereafter, Resource Manager 42 and Database Manager 50 will typically not have information pertaining to the related Associated Values 46 [representations of owner names] pertaining to a Primary Value 44 for Protocols 36 other than the Protocols 36 in which requests have actually been received, that is, will have only the related Associated Values 46 [creator/owner name] existing within the context of the Protocols 36 of the Requests 32 that have been actually received. Therefore, and according to the present invention, Database Manager 50 will (Step 56H) write a Sentinel Value 58 into the Associated Fields 54B corresponding to Protocols 36 wherein the corresponding related Associated Values 46 are not available from System Administrative Functions 60. It should be noted that Sentinel Value 58 is preferably selected to be unique within the context of Database Manager 50 and Resource Manager 42, and preferably unique within the contexts of all Protocols 36.

At this point, a Values Entry 52 exists for the Primary Value 44, and the path of process steps that branched at Step 56D merges in Step 56.

If a Values Entry 52 exists for this Primary Value 44, Database Manager 50 will (Step 56I) read the related Associated Value 46 from the Associated Field 54B corresponding to the Protocol 36 in which the Request 32 was received.

Database Manager 50 will (Step 56J) determine whether the Associated Value 46 read from the Associated Field 54B is a Sentinel Value 58.

If the Associated Value 46 is a not Sentinel Value 58, Database Manager 50 will (Step 56K) compare the Associated Value 46 received in the Request 32 with the related Associated Value 46 read from the Associated Field 54B corresponding to the Protocol 36 of the Request 32 and indicate the result of the comparison to File Manager 42

If Database Manager 50 determines that the Associated Value 46 read from the Associated Field 54B is a Sentinel Value 58, Database Manager 50 will (Step 56L) query System Administrative Functions 60 for the related Associated Value 46 for the Protocol 36 of the Request 32 and, if available, write the related Associated Value 46 for the Protocol 36 into the appropriate Associated Field 54.

Database Manager 50 will then (Step 56M) compare the Associated Value 46 received in the Request 32 with the related Associated Value 46 that has been written into the appropriate Associated Field 54B and indicate the result of the comparison to File Manager 42.

This process will be repeated as described above for each Request 32, with each Sentinel Value 58 entry in an Associated Field 54B being replaced by the related Associated Values 46 for each of the corresponding Protocols 36 as a Request 32 is received in each Protocol 36.

Lastly with respect to the operation of the present invention, and referring to FIG. 5, it will be noted that while the synchronization of related associated values with the corresponding primary value and corresponding related associated values is a dynamic process and is not required to be executed in a single initialization operation. That is, the process need not be dependent upon and executed only upon receiving a request pertaining to a shared resource and the synchronization of values may be executed at any convenient, selected time, such as at preseleted times or intervals or during those periods when the shared resource manager or the system administrative functions are idle or lightly loaded. In addition, the synchronization of function values may be performed upon command or as a consequence of another system operation requiring the remapping of function values, such as a change or updating of the protocols or a reorganization or reassignment of users or resources.

The process of partial or complete updating or remapping of function values is illustrated in FIG. 5. In the instance of a partial updating or remapping of function values, Database Manager 50 (Step 56N) determines that partial remapping of function values is to be performed, such as an update operation. Database Manager 50 will then (Step 56O) read the Associated Fields 54B of Values Entries 52 to identify each Associated Field 54B containing the Sentinel Value 58 and the corresponding Primary Value 44 in the corresponding Primary Value Field 54A. Alternately, and in, for example, the instance of a complete remapping of function values, Database Manager 50 will (Step 56P) determine that a complete remapping operation is to be performed, will (Step 56Q) write the Sentinel Value 58 into each Associated Field 54B of each Values Entry 52, and will (Step 56R) identify each Associated Field 54B of Values Entries 52 and the corresponding Primary Values.

Database Manager 50 will then (Step 56S) query System Administrative Functions 60 with the Primary Values 44 and Protocol 36 identifiers corresponding to the Associated Fields 54B containing Sentinel Value 58, which may be a part of or all of Associated Fields 54B of the Values Entries 52 depending upon whether Database Manager 50 is performing a partial remapping, such as a periodic update, or a complete remapping. System Administrative Functions 60 will (Step 56T) provide to Database Manager 50 such related Associated Values 46 as have been determined by and are available from System Administrative Functions 60 at that time from System Administrative Functions 60, and Database Manager 50 will (Step 56U) write the newly received related Associated Functions 46 into the corresponding Associated Value Fields 54B in replacement of Sentinel Value 58.

With respect to the above, it will be noted that within the context of the present invention, a primary function of System Administrative Functions 60 is the mapping or correlation of Function Values 38 between Protocols 36 on the system level. It will also be noted the specific form and functions of System Administrative Functions 60 will depend upon the specific system in which the present invention is implemented, the functions performed or implemented in that system, and so on. Virtually every System 2 will include such System Administrative Functions 60, however, typically implemented in or in associated with the system operating system, and are well understood by those of ordinary skill in the arts and, as such, need not be discussed further herein.

It will therefore be apparent that the method and apparatus of the present invention as described with respect to FIGS. 3 and 4 accomplishes two purposes. First, the present invention provides a method and apparatus for a shared resource unit to maintain and recognize, that is, synchronize, and respond to different sets of function values for different operating environments or resource protocols for each shared resource managed by the shared resource unit. In terms of the discussions herein above, the present invention is thereby directed to a method and apparatus for synchronizing, that is, relating, a plurality of related Associated Values 46, each of which represents the same or a corresponding Function Value 38 of a corresponding plurality of Protocols 36, to a given corresponding Primary Value 44 that similarly represents the same Function Value 38 in the corresponding Protocols 36. In the example of a file server, a Primary Value 44 may be the name or identifier of a file while the related Associated Values 46 to be synchronized with the Primary Value 44 and with each other are the identifiers of the owner or owners of the file as expressed in the various protocols or operating environments in which file operation requests may be generated.

Secondly, it will be recognized that the present invention provides a method and apparatus for a shared resource unit to synchronize and respond to different sets of function values for different operating environments or resource protocols as the function values appear in requests pertaining to the shared resources by using sentinel values to represent unknown function values. The method and apparatus of the present invention thereby allows the relationships between function values to be ascertained dynamically as requests occur in the protocols using the function values, rather than by requiring that all such function value relationships be ascertained at a single, initial point in time or in a single initial operation. This aspect of the present invention thereby allows operations to proceed without requiring the system administrative functions to determine and validate all function values. In addition, it will be noted that the use of sentinel values to indicate that a function value used in a given protocol has not been ascertained and validated increases the security of shared resources by providing a positive indication that a function value has not been ascertained and validated.

It will be further noted that the present invention provides yet further advantages in the management of shared system resources. For example, the present invention provides a method and apparatus for the information necessary to provide shared system resources to users to be assembled in a single location where information is actually used, that is, in the of shared resource manager, rather than requiring the resource manager to query the system administrative functions each time a function value appears.

It will also be readily recognized by those of ordinary skill in the relevant arts that the present invention as described herein above may be modified or extended without changing the nature or operation of the present invention. For example, a given database values entry may contain and synchronize a plurality of function values for each protocol for each primary value, and may synchronize multiple, equivalent primary values. This may be desirable, for example, in instances wherein it is not desirable or feasible to translate or transform the primary values as expressed in each protocol into a single, common value to be stored in the primary value field of a values entry or in instances wherein the management of a shared resource requires the use of multiple primary values. In such instances, a database values entry may contain multiple primary value fields, or may be comprised of multiple sub-values entries, each of which contains one or more primary value fields and one or more associated values fields. Again, each associated value field may correspond to a protocol, and each sub-values entry may correspond to a protocol. Also, and in yet further embodiments, there may be multiple associate value fields for each protocol in those instances, for example, where multiple associated values are used to control or execute operations of a shared resource, or in performing an operation with a shared resource, or when there are multiple, alternate forms, formats or values for a given associated value in a given protocol.

It will also be apparent to those of ordinary skill in the relevant arts that the present invention may be implemented for any form of shared resource that may be called by multiple, different protocols, as well as the file server shared resource unit used as an example herein. The adaptation of the present invention to different forms of shared resources, different resource managers, different system configurations and architectures, and different protocols will be apparent to those of ordinary skill in the relevant arts.

It will therefore be apparent to those of ordinary skill in the relevant arts that while the invention has been particularly shown and described herein with reference to preferred embodiments of the apparatus and methods thereof, various changes, variations and modifications in form, details and implementation may be made therein without departing from the spirit and scope of the invention as defined by the appended claims, certain of which have been described herein above. It is therefore the object of the appended claims to cover all such variation and modifications of the invention as come within the true spirit and scope of the invention.

What is claimed is:

1. In a shared resource unit providing shared resources to a plurality of resource users submitting requests for shared resource operations in a plurality of protocols, a method for the shared resource unit to synchronize different sets of function values for the protocols for each shared resource managed by the shared resource unit, comprising the steps of:

receiving a request for a shared resource operation expressed in a protocol wherein
the request contains a function value representing a primary value relating to a shared resource and a function value representing a related associated value that is related to the primary value and is used in performing the requested operation, parsing the request to obtain the primary value and the related associated value, determining whether a database contains a values entry corresponding to the primary value appearing in the request, if the database does not contain a corresponding values entry,
constructing a values entry in a database wherein each values entry includes
a primary value field for storing a primary value,
an associated value field for each protocol of the plurality of protocols, each associated value field for storing a related associated value of the corresponding protocol, by
obtaining the related associated value corresponding to the primary value received in the request and the protocol of the request,
writing the primary value into the primary value field of the corresponding values entry,
writing the related associated value into the associated value field corresponding to the request protocol, and
writing a sentinel value into each remaining associated value field of the values entry, reading the associated value field corresponding to the protocol of the request from the values entry corresponding to the primary value, and
if the value in the associated value field corresponding to the request protocol is a related associated value other than a sentinel value,
comparing the related associated value read from the associated value field corresponding to the request protocol to the related associated value received in the request and indicating a result of the comparison to a resource manager, if the value in the associated value field corresponding to the request protocol is a sentinel value,
querying a system administrative function with the primary value read from the corresponding values entry,
receiving from the system administrative function a related associated value corresponding to the primary value and to the protocol of the request,
writing the related associated value into the associated field of the values entry corresponding to the protocol of the request in replacement of the sentinel value,
comparing the related associated value received in the request with the related associated value written into the associated value field corresponding to the protocol of the request, and
indicating the result of the comparison to the resource manager.

2. The method of claim 1 for the shared resource unit to synchronize different sets of function values for the protocols for each shared resource managed by the shared resource unit, wherein:
the resource manager is a file server,
the shared resources are files stored in the file server,
the primary values are file identifiers, and
the related associated values are file owner identifications.

3. The method of claim 1 for the shared resource unit to synchronize different sets of function values for the protocols for each shared resource managed by the shared resource unit, further comprising the steps of:
determining that a remapping of function values is to be performed,
identifying all associated fields containing the sentinel value,
querying the system administrative functions with the primary values corresponding to all associated fields containing the sentinel value,
receiving from the system administrative functions the associated values corresponding to associated field containing the sentinel value and that are available, and
writing the associated values received from the system administrative functions into the corresponding associated fields in replacement of the sentinel value.

4. The method of claim 1, further comprising the preliminary steps of:
determining that the remapping of function values is to be a partial remapping, and
identifying the associated fields containing the sentinel value and the corresponding primary values.

5. The method of claim 1, further comprising the preliminary steps of:
determining that the remapping of function values is to be a complete remapping, and
writing the sentinel value into the associated fields of all the values entries.

6. In a shared resource unit providing shared resources to a plurality of resource users submitting requests for shared resource operations in a plurality of protocols, a method for the shared resource unit to synchronize different sets of function values for the protocols for each shared resource managed by the shared resource unit, a function value synchronization mechanism, comprising:
a protocol interface receiving a request for a shared resource operation expressed in a protocol wherein the request contains a function value representing a primary value relating to a shared resource and a function value representing a related associated value that is related to the primary value and is used in performing the requested operation, the protocol interface and a file manager for parsing the request to obtain the primary value and the related associated value, a database manager for determining whether a database contains a values entry corresponding to the primary value appearing in the request, and if the database does not contain a corresponding values entry, constructing a values entry in a database wherein each values entry includes a primary value field for storing a primary value, an associated value field for each protocol of the plurality of protocols, each associated value field for storing a related associated value of the corresponding protocol, by obtaining from a system administrative function the related associated value corresponding to the primary value received in the request and the protocol of the request, writing the primary value into the primary value field of the corresponding values entry, writing the related associated value into the associated value field corresponding to the request protocol, and writing a sentinel value into each remaining associated value field of the values entry, reading the associated value field corresponding to the protocol of the request from the values entry corresponding to the primary value, and if the value in the associated value field corresponding to the request protocol is a related associated value other than a sentinel value, comparing the related associated value read from the associated value field corresponding to the request protocol to the related associated value received in the request and indicating a result of the comparison to a resource manager, and if the value in the associated value field corresponding to the request protocol is a sentinel value, querying a system administrative function with the primary value read from the corresponding values entry, receiving from the system administrative function a related associated value corresponding to the primary value and to the protocol of the request, writing the related associated value into the associated field of the values entry corresponding to the protocol of the request in replacement of the sentinel value, comparing the related associated value received in the request with the related associated value written into the associated value field corresponding to the protocol of the request, and indicating the result of the comparison to the resource manager.

7. The function value synchronization mechanism of claim 6, wherein:

the resource manager is a file server, the shared resources are files stored in the file server, the primary values are file identifiers, and the related associated values are file owner identifications.

8. The function value synchronization mechanism of claim 6, wherein the database generator further:

determines that a remapping of function values is to be performed, identifies all associated fields containing the sentinel value, queries the system administrative functions with the primary values corresponding to all associated fields containing the sentinel value, receives from the system administrative functions the associated values corresponding to associated field containing the sentinel value and that are available, and writes the associated values received from the system administrative functions into the corresponding associated fields in replacement of the sentinel value.

9. The function value synchronization mechanism of claim 6, wherein the database generator further:

determines that the remapping of function values is to be a partial remapping, and identifies the associated fields containing the sentinel value and the corresponding primary values.

10. The function value synchronization mechanism of claim 6, wherein the database generator further:

determines that the remapping of function values is to be a complete remapping, and writes the sentinel value into the associated fields of all the values entries.

11. In a shared resource unit providing a shared resource to a plurality of resource users submitting requests for shared resource operations in a plurality of protocols, each request including a primary function value relating to a shared resource and an associated function value used in performing a requested operation, a method for the shared resource unit to synchronize the function values of the protocols, comprising the steps of:

receiving and parsing a request for a shared resource operation expressed in a protocol, identifying a database values entry corresponding to the primary function value of the request and reading an associated function value corresponding to the protocol of the request from the values entry, and if the associated function value in the values entry corresponding to the request protocol is an associated function value other than a sentinel value, comparing the associated function value from the values entry to the associated function value of the request and indicating the result of the comparison to the resource manager, and if the associated function value corresponding to the request protocol is a sentinel value, obtaining an associated function value for the primary function value and protocol of the request from a system administive function, comparing the associated function value of the request with the associated function value from the system administrative function, and indicating the result of the comparison to the resource manager.

12. The method for a shared resource unit to synchronize the function values of protocols of claim 11, further comprising the steps of:

determining when the database does not contain a corresponding values entry corresponding to the primary function value of the request, and constructing a values entry corresponding to the primary function value wherein each values entry includes
  a primary function value, and
  an associated function value for each protocol of the plurality of protocols, by
    obtaining an associated function value corresponding to the primary function value and associated function value received in the request and to the protocol of the request from a system administrative function,
    writing the primary function value of the request and the associated function value received from the system administrative function and corresponding to the protocol of the request into the values entry, and
    writing a sentinel value into the values entry for each associated function value corresponding to a protocol other than the protocol of the request.

13. The method of claim 11 method for a shared resource unit to synchronize the function values of protocols of claim 11, wherein:
  the resource manager is a file server,
  the shared resources are files stored in the file server,
  the primary function values are file identifiers, and
  the associated function values are file owner identifications.

14. The method of claim 11 method for a shared resource unit to synchronize the function values of protocols of claim 11, further comprising the steps of:
  determining that a remapping of function values is to be performed,
  identifying all associated function values represented by the sentinel value,
  requesting from the system administrative functions the associated function values corresponding to associated function values that are represented by the sentinel value and that are available, and
  replacing the associated function values represented by the sentinel value with the corresponding associated function values received from the system administrative functions.

15. The method for a shared resource unit to synchronize the function values of protocols of claim 14, further comprising the preliminary steps of:
  determining that the remapping of function values is to be a partial remapping, and
  identifying the associated function values represented by the sentinel value and the corresponding primary values.

16. The method for a shared resource unit to synchronize the function values of protocols of claim 14, further comprising the preliminary steps of:
  determining that the remapping of function values is to be a complete remapping, and
  writing the sentinel value into the values entries to represent all of the associated function values of all the values entries.

17. In a shared resource unit providing a shared resource to a plurality of resource users submitting requests for shared resource operations in a plurality of protocols, each request including a primary function value relating to a shared resource and an associated function value used in performing a requested operation, a function value synchronization mechanism, comprising:
  a protocol interface for receiving and parsing a request for a shared resource operation expressed in a protocol,
  a protocol function database for storing values entries, each values entry including and corresponding to a primary function value and including an associated function value for and corresponding to each protocol of the plurality of protocols, and
  a protocol function database manager for identifying a values entry corresponding to the primary function value of the request and reading an associated function value corresponding to the protocol of the request from the database values entry, and
    if the associated function value in the values entry corresponding to the request protocol is an associated function value other than a sentinel value, comparing the associated function value from the values entry to the associated function value of the request and indicating the result of the comparison to the resource manager, and
    if the associated function value corresponding to the request protocol is a sentinel value, obtaining an associated function value for the primary function value and protocol of the request from a system administrative function, comparing the associated function value of the request with the associated function value from the system administrative function, and indicating the result of the comparison to the resource manager.

18. The function value synchronization mechanism of claim 17, wherein the protocol function database manager is further responsive to a request for a shared resource operation received by the protocol interface and expressed in a protocol for:
  determining when the protocol function database does not contain a values entry corresponding to the primary function value of the request, and
  constructing a values entry corresponding to the primary function value wherein
    each values entry includes
      a primary function value, and
      an associated function value for each protocol of the plurality of protocols, by
        obtaining an associated function value corresponding to the primary function value and associated function value received in the request and to the protocol of the request from a system administrative function,
        writing the primary function value of the request and the associated function value received from the system administrative function and corresponding to the protocol of the request into the values entry, and
        writing a sentinel value into the values entry for each associated function value corresponding to a protocol other than the protocol of the request.

19. The function value synchronization mechanism of claim 17, wherein:
  the resource manager is a file server,
  the shared resources are files stored in the file server,
  the primary values are file identifiers, and
  the related associated values are file owner identifications.

20. The function value synchronization mechanism of claim 17, wherein the protocol function database manager further:
  determines that a remapping of function values is to be performed,
  identifies all associated function values represented by the sentinel value, requests from the system administrative functions the associated function values corresponding to associated function values that are represented by the sentinel value and that are available, and writes the associated function values received from the system administrative functions into the values entries in replacement of the sentinel value.

21. The function value synchronization mechanism of claim 20, wherein the protocol function database manager further:

determines that the remapping of function values is to be a partial remapping, and identifies the associated function values represented by the sentinel value and the corresponding primary function values.

22. The function value synchronization mechanism of claim 20, wherein the database generator further:

determines that the remapping of function values is to be a complete remapping, and writes the sentinel value into all of the values entries to represent all of the associated function values.

* * * * *